United States Patent [19]

Togo et al.

[11] Patent Number: 4,824,909

[45] Date of Patent: Apr. 25, 1989

[54] POWDER COATING COMPOSITION

[75] Inventors: Masahiko Togo; Kazutoshi Abe, both of Yokohama, Japan

[73] Assignee: Nippon Paint Co., Ltd., Osaka, Japan

[21] Appl. No.: 37,064

[22] Filed: Apr. 13, 1987

Related U.S. Application Data

[63] Continuation of Ser. No. 851,115, Apr. 10, 1986, abandoned, which is a continuation of Ser. No. 673,262, Nov. 20, 1984, abandoned.

[51] Int. Cl.$^4$ .............................................. C08L 67/02
[52] U.S. Cl. .................................. 525/124; 525/131; 524/507
[58] Field of Search ................................ 525/124, 131

[56] References Cited

U.S. PATENT DOCUMENTS

| | | | |
|---|---|---|---|
| 3,993,849 | 1/1976 | Victorius | 525/124 |
| 4,020,216 | 4/1977 | Miller | 525/513 |
| 4,246,368 | 1/1981 | Murose | 525/124 |
| 4,247,666 | 11/1981 | Mochizuki | 525/124 |
| 4,281,078 | 7/1981 | Strolle | 525/131 |
| 4,322,508 | 3/1982 | Peng | 525/131 |
| 4,388,445 | 6/1983 | Sugiura | 524/124 |

FOREIGN PATENT DOCUMENTS 1208585 10/1970 United Kingdom .

*Primary Examiner*—Patricia Short
*Attorney, Agent, or Firm*—Wegner & Bretschneider

[57] ABSTRACT

A powder coating composition comprising:
(i) 65% to 95% by weight of a polyester resin comprising terephthalic acid as a main acid component and having a hydroxyl number of 20 to 100 and an acid value of 1 to 20;
(ii) 4% to 30% by weight of a block isocyanate; and
(ii) 0.2% to 30% by weight of an acrylic resin having a hydroxyl group and/or a glycidyl group. This powder coating composition has an improved stain and solvent resistance.

3 Claims, No Drawings

POWDER COATING COMPOSITION

This application is a continuation of U.S. patent application Ser. No. 851,115, filed Apr. 10, 1986, now abandoned, which in turn is a continuation of U.S. patent application Ser. No. 673,262, filed Nov. 20, 1984, now abandoned.

BACKGROUND OF THE INVENTION

1. Field of the Invention

The present invention relates to a powder coating composition. More specifically, it relates to a powder coating composition having an improved stain resistance (or dirt retention) and solvent resistance.

2. Description of the Related Art

Polyester powder coating compositions are widely applied to, for example, refrigerators, washing machines, and electric ovens since these polyester powder coating compositions have excellent corrosion resistance, weathering resistance, and flexibility. However, resistance against stains caused by, for example, oily ink (or magic markers), mustard, and lipstick is strongly required, in addition to the above-mentioned characteristics, and when used as a coating on household appliances such as refrigerators and washing machines, the polyester powder coating compositions have a disadvantage in that their stain resistance is extremely low when compared to that of acrylic powder coating compositions and epoxy powder coating compositions. Various attempts have been made to improve the poor stain resistance of the polyester coating compositions. For example, it has been proposed that the composition of polyester resins be modified so that the polyester resins are not dissolved in solvents. However, these proposals are not satisfactory when put to practical use, in that not only is the stain resistance insufficiently improved, but also the visual appearance of the resultant coating becomes remarkably poor.

SUMMARY OF THE INVENTION

Accordingly, the objects of the present invention are to eliminate the above-mentioned disadvantage of the conventional polyester powder coating compositions and to provide a polyester powder coating composition having an improved stain and solvent resistance.

Other objects and advantages of the present invention will be apparent from the following description.

In accordance with the present invention, there is provided a powder coating composition comprising (i) 65% to 95% by weight of a polyester resin, (ii) 4% to 30% by weight of a block isocyanate, and (iii) 0.2% to 30% by weight of an acrylic resin having at least one group selected from that consisting of a hydroxyl group and a glycidyl group.

DESCRIPTION OF THE PREFERRED EMBODIMENTS

According to the present invention, it has been found that the stain and solvent resistance of a polyester powder coating composition can be improved, without impairing the visual appearance and other characteristics of the coating, by incorporating an acrylic resin having at least one group selected from that consisting of the hydroxyl group and the glycidyl group into conventional polyester powder coating compositions containing a polyester resin and a block insocyanate.

The polyester resins usable in the powder coating compositions according to the present invention are those comprising terephthalic acid as a main acid component and a dihydric alcohol such as ethylene glycol and neopentyl glycol as a main alcohol component and having a hydroxyl number of 20 to 100, preferably 30 to 50, and an acid value of 1 to 20, preferably 1 to 5. The polyester resins usable in the present invention may optionally contain other acids such as isophthalic acid, azelaic acid, and/or sebacic acid, and other alcohols such as diethylene glycol, 1,6-hexane diol, 1,4-cyclohexane dimethanol, and/or trimethylol propane. These polyester resins are also commercially available. Typical examples of such commercially available polyester resins are Ester Resin ER6610, ER6620, ER6700, and ER6800 (manufactured by Nippon Ester Co., Ltd.), Fine Dic M8020 and M8050 (manufactured by Dainippon Ink and Chemicals, Inc.), and Bylon GV100 and GV720 (manufactured by Toyobo Co., Ltd.).

The block isocyanates preferably usable in the powder coating composition according to the present invention include, for example, isocyanates per se such as isophorone diisocyanate, hexamethylene diisocyanate, hydrogenated xylylene diisocyanate, and dicyclohexyl methane diisocyanate, and the adducts derived from the reaction thereof with, for example, ethylene glycol, diethylene glycol, and/or trimethylol propane; and blocked isocyanates derived from the blocking of isocyanates having an isocyanate ring, obtained from the condensation of an isocyanate, with phenols, lactams, alcohols, and oximes. These isocyanates are also commercially available. Typical examples of such commercially available isocyanates are Adduct B-989, B-1065, B-1530, B-1870, and BF-1540 (manufactured by CHEMISHE WERKE HULS AKTIENGESELLSHAFT), Cleran U-1, U-11, U-12, and KL-2525 (manufactured by Bayer), and Takanate Pw4400N, Pw4403N, and Pw7400N (manufactured by Takeda Chemical Industries, Ltd.).

There are no specific limitations to the acrylic resins preferably usable in the powder coating compositions according to the present invention, as long as the acrylic resins have at least one group selected from the group consisting of the hydroxyl group and the glycidyl group. Typical examples of such acrylic resins are those obtained from conventional bulk polymerization, suspension polymerization, or solution polymerization of (A) 1% to 40% by weight of a monomer having the structure:

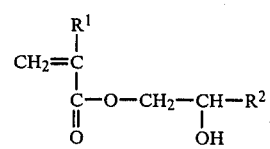

wherein $R^1$ and $R^2$ are independently hydrogen or methyl group, (B) 0% to 50% by weight of a monomer having the structure:

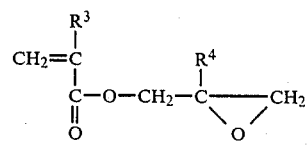

wherein $R^3$ and $R^4$ are independently hydrogen or methyl group, and (C) 10% to 90% by weight of a monomer copolymerizable with the above-mentioned monomers (A) and (B).

Examples of the above-mentioned monomer (A) are 2-hydroxyethyl acrylate and 2-hydroxypropyl acrylate. Examples of the above-mentioned monomer (B) are grycidyl acrylate, grycidyl methacrylate, and methyl grycidyl methacrylate. Examples of the above-mentioned monomer (C) are methyl acrylate, ethyl acrylate, n-propyl acrylate, i-propyl acrylate, n-butyl acrylate, 2-ethylhexyl acrylate, methyl methacrylate, ethyl methacrylate, n-propyl methacrylate, i-propyl methacrylate, 2-ethylhexyl methacrylate, styrene, acrylic acid, methacrylic acid, maleic anhydride, and fumaric acid.

The polymerization of these monomers (A), (B), and (C) can be carried out in any conventional manner. The acrylic resins preferably usable in the present invention are those having a glass transition point of 40° C. to 85° C., more preferably, 60° to 75° C. However, there is no problem, when the acrylic resins which do not adversely affect the blocking of the coating compositions are used. The use of the acrylic resins having both hydroxyl group and glycidyl group is especially preferable.

The polyester powder coatng compositions according to the present invention may optionally contain, for example, an epoxy resin for further improving the corrosion resistance, and any conventional additives such as pigments and antistatic agents.

The polyester powder coating composition according to the present invention can be prepared from the above-mentioned ingredients in any conventional manner. For example, the above-mentioned ingredients are dry blended in a Henschel mixer and is then mixed by an extruder at a resin temperature of, for example, 100° C. to 130° C., followed by grinding and classifying the extrudate after cooling.

According to the present invention, the polyester powder coating composition having an improved stain and solvent resistance, without impairing the visual appearance and other characteristics of the coating, can be provided, as mentioned above. Therefore, the powder coating composition of the present invention can be preferably applied to, for example, refrigerators, washing machines, electronic ovens and steel furnitures in which corrosion resistance, weathering resistance, and stain resistance of the coating are required. Especially, the present powder coating composition is suitable for use in PCM (i.e., pre-coating metal) which has recently been noted as a remarkable effect.

The mechanism of improving the stain resistance in the present polyester powder coating composition is not clearly understood, but it would seem that, without prejudice to the present invention, the acrylic resin having a good stain resistance can be introduced into the coating and the crosslinking density of the coating can be increased.

EXAMPLES

The present invention will now be further illustrated by, but is by no means limited to, the following examples.

Examples 1 to 3 and Comparative Examples 1 and 2

A 100 parts by weight amount of the polyester resin listed in Table 1, 21 parts by weight of Adduct B-1065 (block isocyanate (manufactured by CHEMISCHE WERKE HÜLS AKTIENGESELLSHAFT), 40 parts by weight of titanium white, 1 part by weight of Acronal 4F (a leveling agent manufactured by BASF AG), and the acrylic resin A in an amount listed in Table 1 were dry blended in a Henschel mixer (manufactured by Mitsui Miike Machinery Co., Ltd.). The mixture was melt kneaded at a temperature of 100° C. in Ko-kneader PR-46 (manufactured by Buss Co., Switzerland). After cooling, the extrudate in the form of a flake was ground in a hammer mill and was sieved by a metal wire having an opening size of 150 meshes (Teyler mesh). Thus, the polyester powder coating composition was obtained.

The resultant powder coating composition was evaluated in respect of the stain resistance, visual appearance, and bending property of the coating. The results are shown in Table 1.

TABLE 1

| Example No. | Example | | | Comparative Example | |
|---|---|---|---|---|---|
| | 1 | 2 | 3 | 1 | 2 |
| Polyester resin | *1 | *1 | *1 | *1 | *2 |
| Addition amount*3 of acrylic resin (parts by weight) | 1 | 5 | 30 | 0 | 0 |
| Stain resistance*4 | | | | | |
| Black ink | 4 | 5 | 5 | 2 | 3 |
| Red ink | 5 | 5 | 5 | 2 | 4 |
| Blue ink | 4 | 5 | 5 | 2 | 3 |
| Visual appearance*5 | ++ | ++ | ++ | ++ | − |
| Bending property*6 | ++ | ++ | ++ | ++ | ++ |

*1Ester resin ER6610 (Hydroxyl number = 31, acid value = 3.)
*2Ester resin ER6800 (Hydroxyl number = 32, Acid value = 4)
*3Acrylic resin obtained by solution polymerizing 15 parts by weight of 2-hydroxyethyl methacrylate, 25 parts by weight of glycidyl methacrylate, 20 parts by weight of methyl methacrylate, 20 parts by weight of styrene, and 20 parts by weight of n-butyl methacrylate in the presence of, as an initiator, AIBN (i.e., azobisisobutyronitrile).
*4The powder coating composition was applied to a substrate and baked at a temperature of 200° C. for 15 minutes to form a coating. The resultant coating was stained with black, red or blue magic marker. The stained coating was reciprocally wiped ten times with gauze impregnated with methanol. The remaining stain on the coating was visually observed and the stain resistance of the coating was determined according to the following criteria:
5 ... Stain is completely removed.
4 ... Stain is substantially removed.
3 ... A small amount of stain remaining.
2 ... A large amount of stain remaining.
1 ... Substantially all stain remaining.
*5The powder coating composition was coated on a steel panel (SPCC-SD) plate having a thickness 0.6 mm by a electrostatic coating method and baked at a temperature of 200° C. for 15 minutes. The visual appearance of the resultant coating was visually observed according to the following criteria:
++ ... Excellent
+ ... Good
± ... Fair
− ... Poor
*61-T bending at T-hend method. The results were evaluated according to the following criteria:
++ ... Excellent
+ ... Good
− ... Poor

EXAMPLES 4 to 7

Powder coating compositions were prepared in the same manner as in Examples 1 to 3, except that the acrylic resin A was replaced with acrylic resin B, C, D, or E as shown in Table 2.

The powdered coating compositions were evaluated in the same manner as in Examples 1 to 3. The results are shown in Table 2.

TABLE 2

| Example No. | 4 | 5 | 6 | 7 |
|---|---|---|---|---|
| Polyester resin | *1 | *1 | *1 | *1 |
| Acrylic resin*7 | B | C | D | E |
| Addition amount of acrylic resin | 5 | 5 | 5 | 5 |

TABLE 2-continued

| Example No. | 4 | 5 | 6 | 7 |
|---|---|---|---|---|
| (parts by weight) | | | | |
| Stain resistance*4 | | | | |
| Black | 4 | 5 | 5 | 5 |
| Red | 4 | 5 | 5 | 5 |
| Blue | 4 | 5 | 5 | 5 |
| Visual appearance*5 | ++ | ++ | ++ | ++ |
| Bending property*6 | ++ | ++ | ++ | ++ |

*1, *4, *5, *6 ... See Remarks of Table 1.
*7Acrylic resins were prepared as follows:
(1) Acrylic resin B was obtained by solution polymerizing 5 parts by weight of hydroxypropyl methacrylate, 50 parts by weight of methyl methacrylate, 30 parts by weight of styrene, and 15 parts by weight of ethyl acrylate in the presence of AIBN as an initiator.
(2) Acrylic resin C was obtained by solution polymerizing 7 parts by weight of hydroxypropyl methacrylate, 10 parts by weight of glycidyl methacrylate, 5 parts by weight of β-methyl glycidyl methacrylate, 48 parts by weight of methyl methacrylate, 20 parts by weight of isobutyl methacrylate, and 10 parts by weight of isobutyl acrylate in the presence of AIBN as an initiator.
(3) Acrylic resin D was obtained by solution polymerizing 10 parts by weight of 2-hydroxyethyl acrylate, 35 parts by weight of glycidyl methacrylate, 15 parts by weight of n-butyl acrylate, and 30 parts by weight of styrene in the presence of AIBN as an initiator.
(4) Acrylic resin E was otained by solution polymerizing 35 parts by weight of 2-hydroxy-ethyl methacrylate, 20 parts by weight of glycidyl methacrylate, 20 parts by weight of methyl methacrylate, 10 parts by weight of 2-ethylhexyl acrylate, and 15 parts by weight of styrene in the presence of AIBN as an initiator.

We claim:

1. A powder coating composition consisting essentially of a melt-blended resin of:
   (i) 65% to 95% by weight of a polyester resin comprising terephthalic acid as a main acid component and a dihydric alcohol as a main alcohol component and having a hydroxyl number of 20 to 100 and an acid value of 1 to 20;
   (ii) 4% to 30% by weight of a blocked isocyanate; and
   (iii) 0.2% to 30% by weight of a non-rubbery acrylic resin having a glass transition temperature of 40° C. to 85° C. and having at least one hydroxyl group and at least one glycidyl group.

2. A powder coating composition as claimed in claim 1, wherein said acrylic resin has a hydroxyl number of 5 to 150, a glycidyl group content of $3.5 \times 10^{-3}$ g equivalent/g or less, and a weight-average molecular weight of 3000 to 50000.

3. A powder coating composition as claimed in claim 1 wherein the melt-blended resin further contains a pigment.

* * * * *